United States Patent Office 3,228,195
Patented Jan. 11, 1966

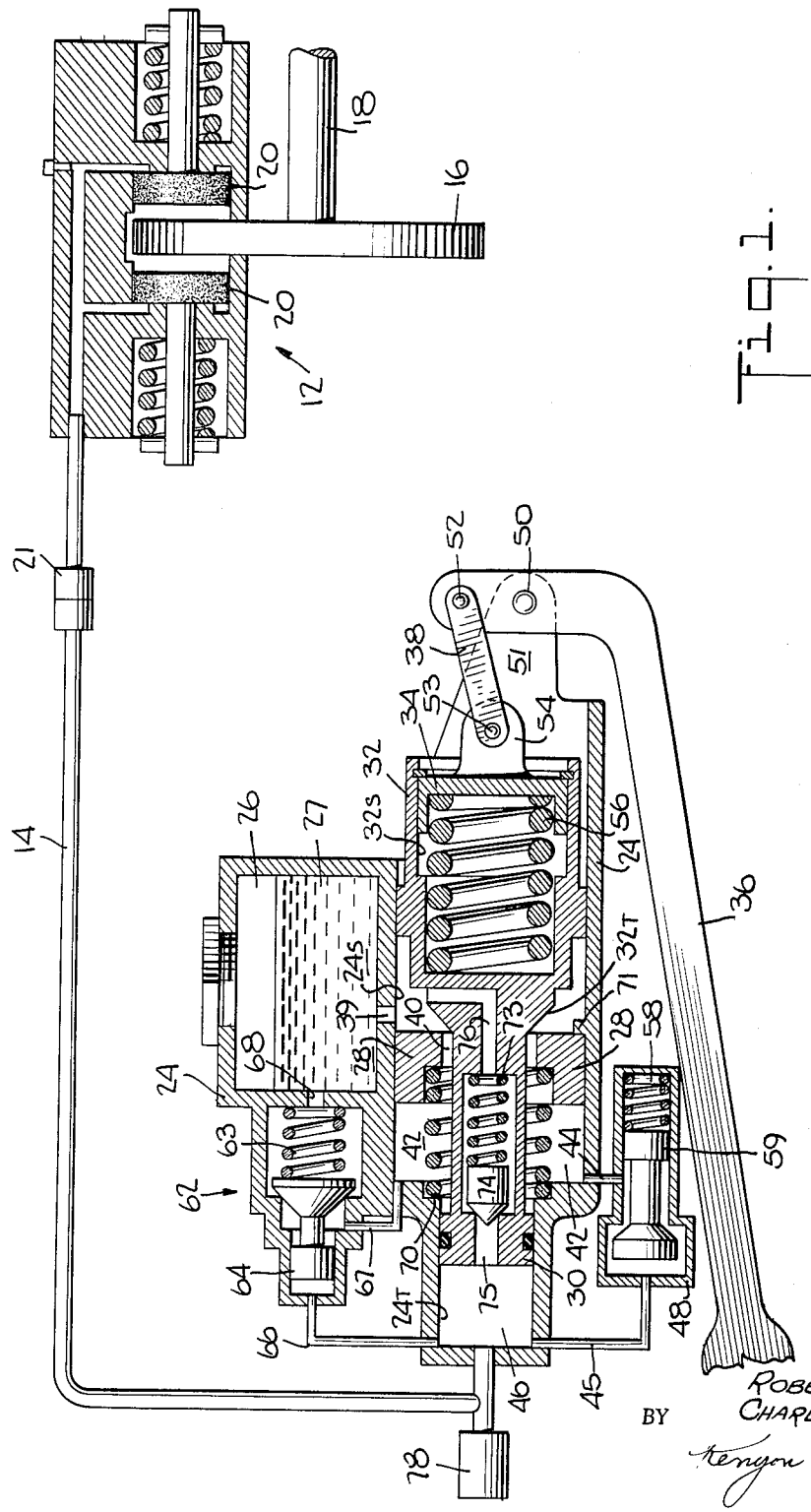

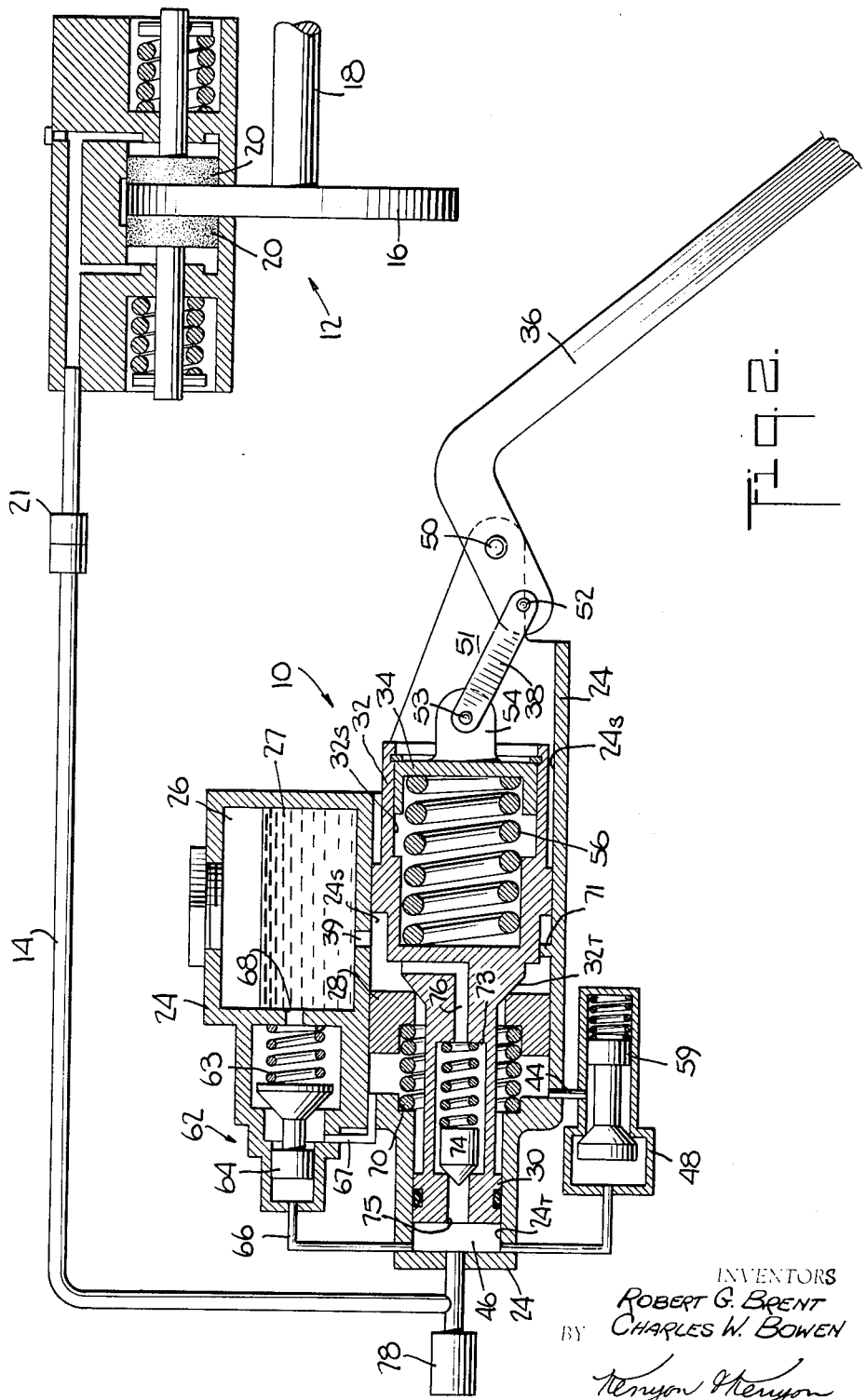

3,228,195
HYDRAULIC BRAKE
Robert G. Brent and Charles W. Bowen, Arlington, Tex., assignors to Bell Aerospace Corporation, Wheatfield, N.Y., a corporation of Delaware
Filed Apr. 15, 1964, Ser. No. 359,871
5 Claims. (Cl. 60—54.6)

This invention relates in general to hydraulic brakes and more particularly to a master cylinder unit adapted for use with a system requiring a large fluid displacement in addition to a relatively high operating pressure. Such a master cylinder unit is required where a system includes a braking unit which has a relatively large clearance between the brake disc and brake shoes and which must develop a relatively high braking force on contact between brake disc and brake shoes.

The problem to which this invention is addressed is peculiar to hydraulic brakes. The problem arises out of the fact that a given displacement of fluid in a given hydraulic system will provide a fixed amount of work for application to the braking elements. Thus, from a consideration of the fundamental proposition that work=force × distance, it can be seen that the greater the distance which must be traversed by the force that is developed, the less can that force be in magnitude. If the movable element of the brake unit must traverse a considerable distance in order to make effective contact with the fixed element, then the amount of force that can be developed will be less than if the distance to be traversed were shorter. Thus the relationship that should be kept in mind in understanding the problem to which this invention is addressed is that there is an inverse relationship between the braking force and the spacing between the braking elements. For a given brake system design, the more there is of one, the less there will be of the other.

To put it another way, if the man who operates the hydraulic brake can exert a given force of say 50 lbs. on the brake lever, that force will provide the greater fluid pressure if the fluid displacement is minimized.

In order to develop maximum braking force, it is desirable, therefore, to design the distance between braking elements to be as small as possible. However, there is a practical limit to how close a clearance can be tolerated because of the importance of avoiding drag between the braking elements (shoe and drum or disc and caliper) when no braking is desired. The swelling of material, misalignment between the braking elements, limitations on dimensional tolerances all result in a tendency for the braking elements to be in contact when no braking is desired. As a result, there will be excessive wear and heating with possible consequences of fire. Thus systems with maximum reliability require large clearances. The wear and heating also mean a greater maintenance and replacement cost.

The common shoe and drum brake is usually arranged to provide self-energizing action by the appropriate disposition of posts, pivot pins, etc., as is well known in the field. By self-energization is meant that the normal force exerted by the shoe on the drum is caused to increase as a result of the frictional force developed between the two parts which results in a reduced hydraulic pressure requirement to effect braking action.

The disc and caliper type brake has advantages over the shoe and drum brake because of its greater heat capacity and its consequent greater resistance to fade ("fade" being the reduction in braking efficiency from heating of the braking elements). This advantage has resulted in increased use of the disc and caliper brake in severe applications such as on racing cars and aircraft. A deterrent to its more extended application for general use has been that a relatively larger or higher capacity power boost system is required for high braking force as this braking system cannot easily be configured to self-energize. The present invention overcomes this limitation by eliminating the need for recourse to auxiliary boost systems in order to achieve a high braking pressure with the disc and caliper brake. However, the invention may be used with either type of brake to enhance braking force.

Accordingly, it is a major object of this invention to provide a braking system which will permit an adequate clearance between the braking elements and yet will develop relatively high pressure between the elements when the elements are used to supply a braking force.

It is a more particular object of this invention to provide a braking system having a high displacement, low pressure operating characteristic as the braking elements (e.g., disc and caliper) are brought together and which will then automatically shift to a high pressure, low displacement operating characteristic when contact is established between the braking elements.

It is a further object of this invention to obviate the need for frequent adjustments of the caliper or shoe, whether by self-adjusting means or manually, thereby contributing to simplification of the brake design.

In brief, this invention involves a master cylinder having what is in effect a split piston. There is an inner piston (having the smaller diameter) and an outer piston (having the larger diameter) arranged so that they are co-axial with one another, but so that each piston operates in its own cylinder. The master cylinder includes a means for initially moving both pistons simultaneously so as to displace fluid from both cylinders and thereby provide a relatively large fluid displacement. The large fluid displacement causes the brake calipers to come into contact with the brake disc. After contact has been established and a pre-determined minimum pressure built up, a means is provided to shunt off the effect of the outer piston and its cylinder so that braking pressure is developed solely by the inner piston and its cylinder. In this fashion, the operator force is initially used to displace a relatively large quantity of hydraulic fluid at a lesser pressure in order to bring the braking elements together and the same operator braking force is then applied to displace a smaller quantity of braking fluid at a greater pressure to provide actual braking force.

Other objects and purposes of this invention can be understood from the following detailed description and drawings, in which:

FIG. 1 is a cross-sectional view of the braking system of this invention in the "ready-to-operate" or non-braking state, and FIG. 2 is a cross-sectional view similar to FIG. 1 except that it shows the braking system of this invention in the braking state.

FIG. 1 illustrates a preferred embodiment of the braking system of this invention. The system has two main sections, the master cylinder assembly section 10 and the brake section 12 which are connected by a fluid line 14.

The brake section 12 is fairly standard and includes a brake disc 16 attached to a shaft 18, which shaft 18 may lead to the moving device or mechanism which it is desired to brake (for example a helicopter rotor). Brake calipers 20 are spring loaded to be normally spaced from the brake disc 16. Because of this invention, these brake calipers 20 may be conveniently spaced sufficiently from the brake disc 16 so that there will be no drag between the disc 16 and calipers 20 when in the unbraked state shown in FIG. 1 and no adjusting mechanism to account for shoe wear need be employed. A coupling 21 couples the fluid line 14 to the ports 22 and 23 which lead to the spring loaded brake calipers 20. When fluid pressure is supplied to the ports 23, the brake calipers 20 are moved toward the brake disc 16 to engage the disc 16 and apply braking power.

The master cylinder assembly section 10 is somewhat complicated and a description of how it functions can best be comprehended by an initial understanding of the relationship between some of the parts in this section 10.

A stationary housing 24 serves a number of functions. It provides a chamber which serves as the reservoir 26 for holding hydraulic fluid 27. The housing surface 24S provides a cylindrical surface on which the outer piston 28 rides while the housing surface 24T provides another cylindrical surface on which the inner piston 30 rides. The inner piston 30 is simply the front end of a movable member 32. This movable member 32 is co-axial with the cylindrical surfaces 24S and 24T. The longitudinal position of this movable member 32 is determined by the position of the accumulator piston 34, which piston 34 rides on the inner surface 32S of the movable member 32. The position of the accumulator piston 34, in turn, is determined by the position of the operating lever 36 which is connected by link 38 to the accumulator piston 34.

In the position shown in FIG. 1, hydraulic fluid is supplied from the reservoir 26 through the ports 39 and 40 to the chamber 42, which chamber 42 is in front of the outer piston 28. Hydraulic fluid is further supplied through the ports 44 and 45 to the chamber 46, which chamber 46 is in front of the inner piston 30. A normally open spring loaded valve 48, which will herein be called the primary valve 48, is interposed between the ports 44 and 45 so as to close off these ports from one another when pressure goes above a certain pre-determined amount for a purpose that will be described further on. Suffice it to point out here that the flow of fluid to the chamber 46 is through this primary valve 48.

The primary valve 48 has been deemed normally open to indicate that it is open when the braking system is in the non-braking state. In this description, and particularly in the claims, it shall be understood that the designation of an element as "normally closed' or "normally in communication with" refers to the state of the element when the system is not braking.

With the foregoing description in mind, the following description of the operation of this braking system will be more readily understood. The manually operated operating lever 36 is pivoted about point 50 on the lug 51, which lug 51 is fixed to the housing 24. The link 38 is pivotally mounted at the points 52 and 53 to connect the operating lever 36 with a lug 54, which lug 54 is mounted on the accumulator piston 34. Thus as the operating lever 36 is moved from the position shown in FIG. 1 to the position shown in FIG. 2, the accumulator piston 34 will be forced forward (to the left in the figures). It might be noted at this point that when the operating lever 36 is swung to the braking position shown in FIG. 2, the overcenter pivoting mechanism illustrated causes the lever 36 to be "locked" in the braking position so that it may be "unlocked" only by intentional return of the operating lever 36 by the pilot or other operator.

As the accumulator piston 34 is forced forward, pressure is applied, through the accumulator spring 56, to the movable member 32, thereby forcing the movable member 32 forward. The conical surface 32T of the movable member 32 soon engages the outer piston 28, thereby shutting off the port 40 and forcing the outer piston 28 forward. The inner piston 30 being integral with the movable member 32 will move forward simultaneously. Accordingly, the motion forward of the outer piston 28 and of the inner piston 30 will force fluid through the line 14 to cause the brake calipers 20 to traverse the distance towards the brake disc 16. The fluid that is being displaced into the line 14 will be from the chamber 42 as well as the chamber 46 so that a relatively large amount of fluid is displaced thereby serving to displace the brake calipers 20 a relatively large distance though at a relatively low pressure.

When the brake calipers 20 contact the brake disc 16, pressure will start to build up. The normally open primary valve 48 is designed to close at a relatively low pressure of, for example 50 p.s.i.g. When the primary valve 48 closing pressure is reached in the system, the spring 58 loaded piston 59 moves to the right thereby blocking communication between the chamber 42 and the chamber 46. Thus further movement forward of the pistons 28 and 30 will only serve to supply fluid from the chamber 46 to the line 14. Accordingly, the completion of the braking motion and the actual effective braking itself takes place with a relatively great pressure between the brake calipers 20 and the brake disc 16 to provide relatively great braking force.

Once the primary valve 48 blocks communication between the chamber 42 and the chamber 46, it becomes necessary to provide an alternate path for fluid from the chamber 42 since the subsequent movement forward of the inner piston 30 will be accompanied by an equal movement forward of the outer piston 28. The normally closed secondary valve 62 provides an outlet means for the fluid in chamber 42. The spring 63 loaded piston 64 maintains the secondary valve 62 normally closed.

The strength of the spring 63 and the diameter of the piston 64 are selected so that this secondary valve 62 will open at a system fluid pressure (64 p.s.i.g. in one embodiment) which is slightly greater than the pressure (50 p.s.i.g in the same embodiment) necessary to close the primary valve 48. When the primary valve 48 closes under 50 p.s.i.g., that same pressure is supplied to the piston 64 through the line 66. Additional forward movement of the pistons 28 and 30 will increase the pressure in the line 66 and will also force fluid from the chamber 42 through the line 67 thereby increasing the pressure in the secondary valve 62 to a magnitude greater than 50 p.s.i.g., and thus opening the valve 62. Once the valve 62 is opened, fluid from the chamber 42 will simply flow through the line 67, the valve 62 and the port 68 into the reservoir 26.

From a practical point of view, it is necessary that the secondary valve 62 be designed to open at a system fluid pressure greater than the pressure at which the primary valve 48 is designed to close. If both valves were designed to operate at the same pressure, tolerances affecting the area of the respective valves, spring strengths, etc., could, and in many cases undoubtedly would, cause the secondary valve 62 to open before the primary valve 48 closes. This would relieve pressure in the main line 14 and chamber 46 so that the main valve might never close and, in general, rendering the entire system unsatisfactory. To protect against this very real possibility, the secondary valve 62 is designed to operate at a reasonably higher pressure than the primary valve 48.

The effect of these movements of the primary valve 48 at 50 p.s.i.g. of the secondary valve 62 at 64 p.s.i.g. is to permit fluid displacement by both outer piston 28 and inner piston 30 until effective contact is made between the brake calipers 20 and the brake disc 16, at which time the fluid being displaced by the outer piston 28 is shunted back to the reservoir 26 and the inner piston 30 is used for application of effective braking pressure. In this fashion, relatively large displacement can be initially achieved to close the gap between the brake calipers 20 and brake disc 16 while upon contact between these two braking elements, high hydraulic pressure and force can be produced with the same system to provide a much more effective braking action.

There are certain further details of the braking system illustrated in the figures which should be understood for a complete comprehension of this device.

The accumulator spring 56 is used to store energy which can be drawn upon to compensate for losses such as may be caused by fluid leakage. The spring 56 is placed in compression when the operating lever 36 is placed in full braking position and is maintained under pressure by the overcenter mechanism which "locks" the operating lever 36 in position.

The outer piston 28 is attached to neither the housing 24 nor to the movable member 32. Accordingly, it is spring loaded by spring 70 so that it will normally be in the rightmost position shown in FIG. 1. A stop 71 keeps the outer piston 28 from moving further to the right than is shown in FIG. 1 and thereby maintains the port 40 open as long as the operating lever 36 is in the unbraked position.

A small spring 73 loaded relief valve 74 is included to crack at approximately 250 p.s.i.g. to set an upper pressure limit for reasons of safety. If the valve 74 does crack, fluid from the chamber 46 will return to the reservoir through ports 75 and 76.

A pressure switch 78 is shown in block form. Its function is to provide the pilot or operator with a cockpit warning light which will indicate that braking action has commenced or is still in effect. This pressure switch, in one embodiment, turns the cockpit warning light on at 10 p.s.i.g. with increasing pressure and turns the warning light off at 5 p.s.i.g. with decreasing pressure.

Although one embodiment of this invention has been described and illustrated in some detail, it is to be understood that many variations in the details would be obvious to one skilled in this art.

For example, it is convenient to have the valve 48 communicate to the chamber 46. However, it would be perfectly possible to have the line 45 from valve 48 connect directly to the main line 14. Accordingly, claims which call for communication between elements shall be understood to mean communication whether it be direct or indirect. Thus a claim to communication between the valve 48 and the chamber 46 shall include a line 45 connection to the line 14 since the line 45 plus the line 14 effects the called for communication.

Accordingly, the claims are directed to the invention underlying the detailed mechanism disclosed.

What is claimed is:

1. In a master cylinder which is adapted for use in a hydraulic braking system, said cylinder having a first chamber, a second chamber and means interconnecting said chambers so that said chambers are normally in communication with one another, the improvement comprising:
    (a) a normally open valve in said means interconnecting said first chamber and said second chamber, said normally open valve being responsive to pressure in said first chamber and being set to close when the pressure in said first chamber exceeds a first predetermined magnitude, the closing of said normally open valve serving to block communication between said first chamber and said second chamber, and
    (b) a normally closed valve connected to said second chamber so that when said normally closed valve is open said second chamber is in communication with an environment outside of said chambers, said normally closed valve being responsive to pressure in said first chamber and being set to open when the pressure in said first chamber exceeds a second predetermined magnitude, said second predetermined magnitude being greater than said first predetermined magnitude.

2. In a master cylinder assembly adapted for use in a hydraulic braking system, said master cylinder assembly including a first chamber, means interconnecting said chambers, a second chamber, and a reservoir for supplying fluid to said chambers, the improvement comprising:
    (a) a normally open valve in said means interconnecting said first chamber and said second chamber, said normally open valve being responsive to pressure in said first chamber and being set to close when the pressure in said first chamber exceeds a first predetermined magnitude, the closing of said normally open valve serving to block communication between said first chamber and said second chamber, and
    (b) a normally closed valve between said second chamber and said reservoir, said normally closed valve being responsive to pressure in said first chamber and being set to open when the pressure in said first chamber exceeds a second predetermined magnitude, said second predetermined magnitude being greater than said first predetermined magnitude, the opening of said normally closed valve serving to place said second chamber in communication with said reservoir.

3. A master cylinder assembly adapted for use in a hydraulic braking system, said system having braking elements connected by a main hydraulic line to said master cylinder assembly, said master cylinder assembly comprising:
    (a) a first fluid chamber having a first opening adapted to be placed in communication with said main hydraulic line,
    (b) means for forcing fluid from said first chamber through said first opening,
    (c) a second fluid chamber having a second opening,
    (d) means for forcing fluid from said second chamber through said second opening,
    (e) a normally open hydraulic valve between said chambers to place said second opening of said second chamber in normal communication with said first chamber, said normally open valve being responsive to pressure in said first chamber and being set to close when the pressure in said first chamber exceeds a first predetermined magnitude,
    (f) a fluid reservoir, and
    (g) a normally closed hydraulic valve between said second chamber and said reservoir, said second valve being responsive to pressure in said first chamber and being set to open when the pressure in said first chamber exceeds a second predetermined magnitude, said second predetermined magnitude being greater than said first predetermined magnitude.

4. A master cylinder assembly adapted to be used in a hydraulic braking system, said system having braking elements connected by a main hydraulic line to said master cylinder assembly, said master cylinder assembly comprising:
    (a) a first chamber adapted to be placed in communication with said main hydraulic line,
    (b) a first piston slidably mounted in said first chamber,
    (c) a second chamber normally in communication with said first chamber,
    (d) a second piston slidably mounted in said second chamber,
    (e) a normally open hydraulic valve between said chambers and responsive to pressure in said first chamber, said normally open valve being set to close in response to pressure greater than a first predetermined magnitude in said first chamber to block communication between said chambers at pressures greater than said first predetermined value,
    (f) a fluid reservoir,
    (g) a normally closed hydraulic valve between said reservoir and said second chamber to place said second chamber in communication with said reservoir when said normally closed valve is open, said normally closed valve being responsive to pressure in said first chamber and being set to open when the pressure in said first chamber is greater than a second predetermined magnitude, said second predetermined magnitude being greater than said first predetermined magnitude, and (h) means for controlling the position of said pistons within said chambers.

5. A master cylinder assembly adapted to be used in a hydraulic braking system, said system having braking elements connected by a main hydraulic line to said master cylinder assembly, said master cylinder assembly comprising:
 (a) a first chamber adapted to have its forward portion placed in communication with said main hydraulic line,
 (b) a normally retracted first piston slidably mounted in said first chamber,
 (c) a second chamber having a forward portion,
 (d) a normally retracted second piston slidably mounted in said second chamber,
 (e) first means to normally place the forward portion of said second chamber in communication with the forward portion of said first chamber, said means including a normally open hydraulic valve between said chambers, said normally open valve being responsive to pressure in said first chamber and being set to close in response to pressure in said first chamber that is greater than a first predetermined magnitude to block communication between said chambers at pressures greater than said first predetermined magnitude,
 (f) a fluid reservoir,
 (g) second means to hydraulically couple said forward portion of said second chamber to said reservoir, said second means including a normally closed hydraulic valve to place said forward portion of said second chamber in communication with said reservoir when said normally closed valve is open, said normally closed valve being responsive to pressure in said first chamber and being set to open when the pressure in said first chamber is greater than a second predetermined magnitude, said second predetermined magnitude being greater than said first predetermined magnitude, and
 (h) manually operable lever means for controlling the position of said pistons within said chambers,
  whereby, with fluid in said chambers, forward movement of said pistons by said lever will force fluid from both of said chambers into said main hydraulic line until pressure having said first predetermined magnitude is attained, at which point said normally open valve will close so that further movement forward of said pistons will force fluid into said main line only from said first chamber; and
  whereby said normally closed valve will open when the pressure in said first chamber attains said second predetermined magnitude, at which point further forward movement of said pistons will force fluid from said second chamber into said reservoir while fluid from said first chamber continues to be forced into said main hydraulic line.

References Cited by the Examiner
UNITED STATES PATENTS

| | | | |
|---|---|---|---|
| 1,921,008 | 8/1933 | Shinn | 60—54.6 |
| 2,291,056 | 7/1942 | Pallady | 60—54.6 |
| 2,347,349 | 4/1944 | Humphrey | 60—54.6 |
| 2,518,821 | 8/1950 | Roy | 60—54.6 |
| 2,739,448 | 3/1956 | Troy | 60—54.6 |
| 2,917,900 | 12/1959 | Kirk | 60—54.6 |
| 2,955,427 | 10/1960 | Porkert | 60—54.6 |
| 3,062,010 | 11/1962 | Krusemark | 60—54.6 |

FOREIGN PATENTS

| | | |
|---|---|---|
| 44,331 | 10/1934 | France. |

SAMUEL LEVINE, *Primary Examiner.*

ROBERT R. BUNEVICH, *Examiner.*